July 26, 1927.

C. C. JACOBSON 1,636,962

HYDRAULIC MOLDING PRESS

Filed April 2, 1926

INVENTOR:
Conrad C. Jacobson
By Attorneys,
Fraser, Myers & Manley

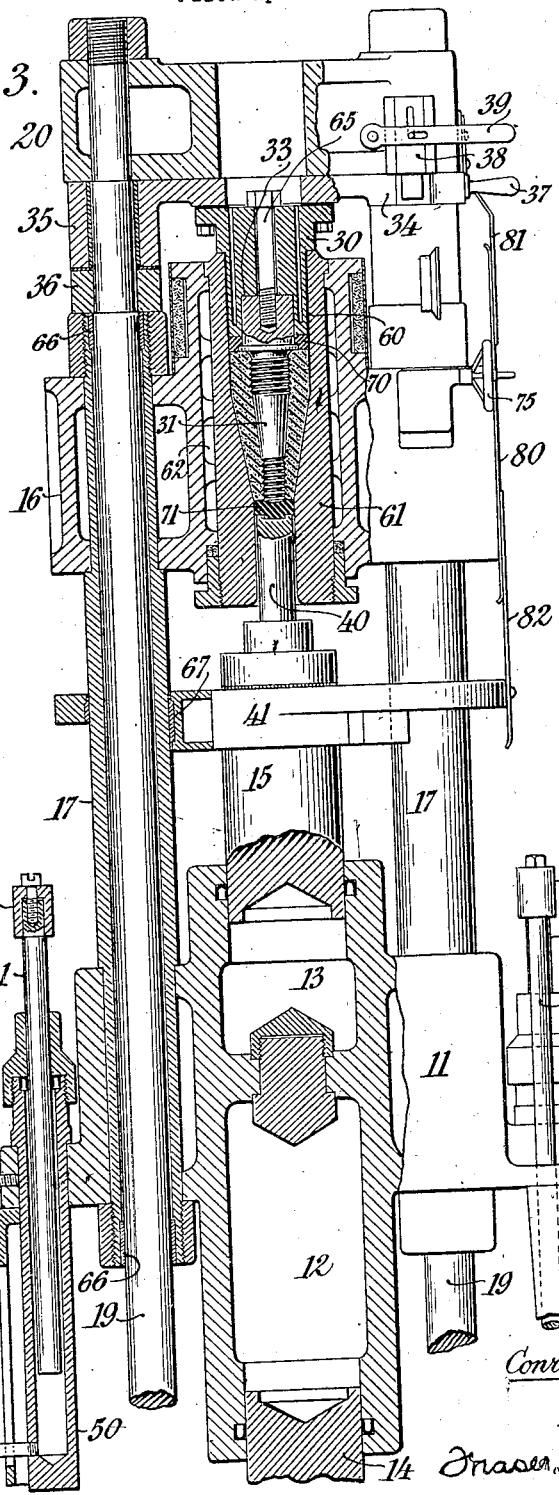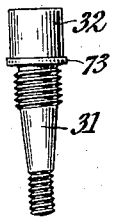

July 26, 1927.

C. C. JACOBSON 1,636,962

HYDRAULIC MOLDING PRESS

Filed April 2, 1926   3 Sheets-Sheet 3

INVENTOR:
Conrad C. Jacobson,
By Attorneys,

Patented July 26, 1927.

1,636,962

UNITED STATES PATENT OFFICE.

CONRAD C. JACOBSON, OF GLEN RIDGE, NEW JERSEY, ASSIGNOR TO JOHN ROBERTSON CO. INC., OF BROOKLYN, NEW YORK, A CORPORATION OF NEW YORK.

HYDRAULIC MOLDING PRESS.

Application filed April 2, 1926. Serial No. 99,284.

This invention provides an improved construction of hydraulic presses for molding articles of plastic composition. It is especially designed for articles which are formed in a molding chamber, where it is desirable that the article receive pressure from opposite ends of the molding cavity.

The press is of upright construction, having a stationary hydraulic cylinder suitably supported on frames, and above this a stationary molding member containing the molding cavity. Beneath the molding cavity is a plunger adapted to rise and close the bottom of the cavity, this plunger being mounted on a hydraulic ram the cylinder of which is preferably formed integrally with the first-named hydraulic cylinder. Above the molding cavity is a molding plunger or mandrel carried on a movable crosshead which is connected by tie-rods or pillars with a crosshead beneath, and the latter carries the ram of the lower hydraulic cylinder. Valves are provided for directing water into either or both the hydraulic cylinders for moving under suitable pressure the respective molding plungers. A pair of hydraulic backing cylinders is provided, having rams suitably connected to the movable member of the press (comprising the connected upper and lower crossheads and the parts moving them), whereby to lift such movable member after each molding operation.

The preferred embodiment of the invention is illustrated in the accompanying drawings, wherein—

Fig. 3 is a fragmentary sectional elevation viewed in the direction of Fig 1, but on a larger scale, showing the parts more in detail, the position of the parts being that at the close of the molding operation.

Fig. 7 is an elevation of the mandrel or core shown in Fig. 3 removed.

Fig. 8 is a section of the molded object shown in Fig. 3, after removal.

The preferred construction thus illustrated will now be described.

Figure 4:
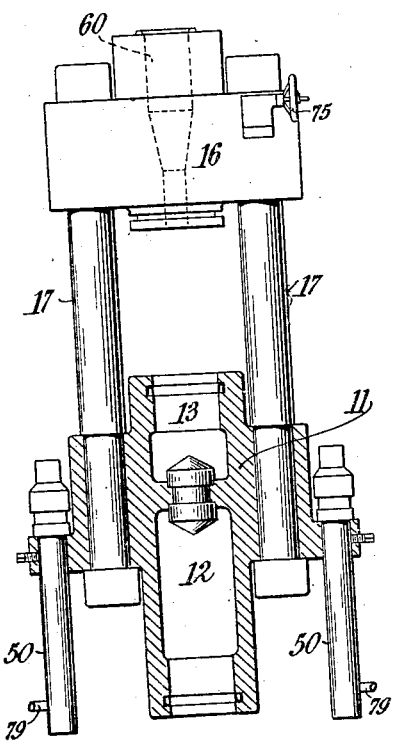
Fig. 4 is a sectional elevation of the stationary parts of the press.
Figure 5:
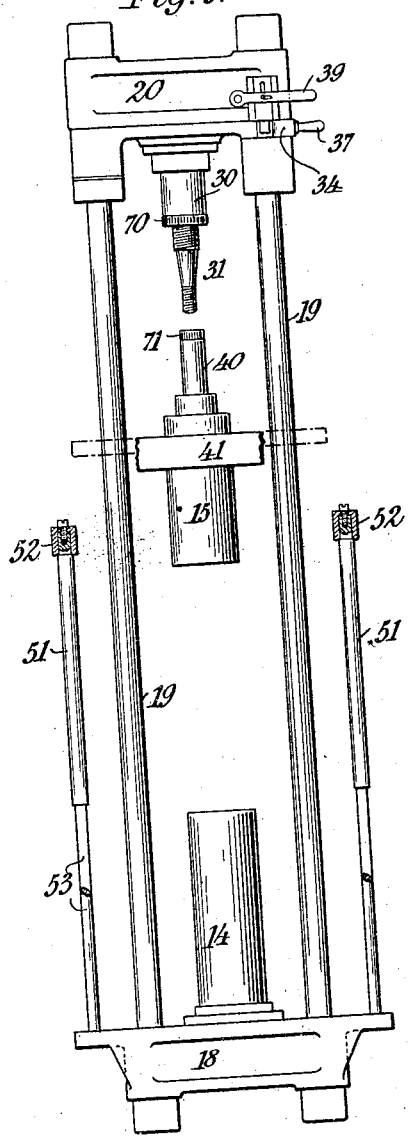
Fig. 5 is an elevation of the movable parts of the press; both viewed in the same direction as Fig. 1.

10, 10, are supporting frames, the nature of which will depend upon the location in which the press is mounted; as shown, they are ordinary A frames. On them is mounted the main or base casting 11, in which are formed, preferably integrally, the two hydraulic cylinders 12 and 13 (Fig. 4). In these work respectively the hydraulic rams 14 and 15 (Fig. 5).

Above the main cylinder casting 11 is another stationary part 16, shown in the form of a crosshead casting, and which is supported and connected to the base casting 11 by pillars 17, 17, which preferably are made tubular, as shown in Fig. 3. Thus the stationary crosshead 16 is tied fast to the main casting 11, and is made capable of resisting the pressures communicated through the molding plungers, as will be described.

The lower hydraulic ram 14 is mounted on a crosshead 18 which is connected by tie-rods or pillars 19, 19, with an upper crosshead 20 which carries the upper molding plunger 30. The lower molding plunger 40 is carried by the hydraulic ram 15, its connection being conveniently made through a sliding crosshead 41. The connections and relations of these moving parts are clearly shown in Fig. 5, where they are isolated from the stationary parts, which are found in Fig. 4.

The stationary parts or members of the press carry stationary backing cylinders 50, 50, the rams 51, 51 of which are connected to the movable members 14, 18, 19, 20. This connection is conveniently made by attaching the rams to the middles of crossheads 52, which at opposite sides are connected by tie-rods 53 to the lower crosshead 18. By connecting a source of hydraulic pressure to the stationary backing cylinders 50, a constant lifting thrust is exerted through parts 51, 52, 53, upon the movable members 14, 18, 19, 20, of the press. This lifting stress is sufficient to lift all these parts when freed from any downward hydraulic thrust in the cylinder 12. The difference in areas of the respective hydraulic cylinders is such that when water under the same pressure is admitted to cylinders 12 and 50, the cylinder 12 exerts a greatly preponderant force whereby the entire movable member is forced downward and the rams 51 are pushed into their cylinders, displacing the water therefrom.

The movable members of the press are suitably guided in their vertical movement by any construction in the nature of a slideway. A simple construction is that shown and which is preferred, namely, that the tierods 19 slide through the hollow columns 17, being made a fairly close working fit therein. The tie-rods 19 may be solid or hollow, according to the strength required.

The upper casting 16 carries the molding cylinder or chamber 60, which may be of any suitable or known construction. Thus it could be formed as a mere cavity or chamber in the casting 16; or preferably it may be formed in a separate cylinder 61 suitably fastened in place within the casting 16. For molding compositions which require to be heated (or cooled) a heating (or cooling) jacket 62 is formed around the cylinder 60, into which jacket may be introduced any medium or means for varying the temperature. Thus, for example, this may be a steam or water jacket, or may contain an electric heater, these expedients for heating or cooling being well known.

Figure 6:
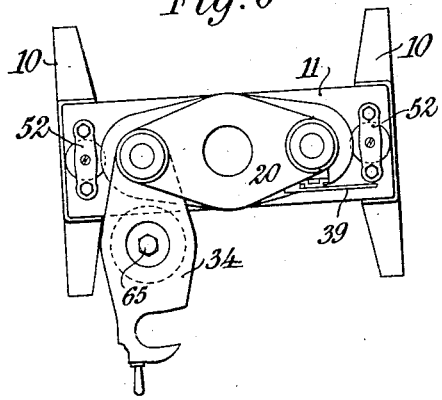
Fig. 6 is a plan of the upper part of the press showing the swinging head for the upper molding plunger turned outwardly.

The molding chamber or cavity 60 is open at both ends. The bottom end is entered by the molding plunger 40, while the upper end is entered by the molding plunger 30. The shape and dimensions of the respective open ends and of the plungers entering them will of course depend upon the shape and nature of the object to be molded. In the drawing the bottom end is shown as of smaller diameter and reduced area, as compared with the upper end. Whether the plungers 30 and 40 are simply plungers adapted to merely exert end pressures within the cavity, or formed as cores or mandrels for entering within and internally shaping the molded object, will also depend upon the nature and shape of such objects. In the construction shown the lower plunger 40 is shown as a simple plunger making merely end contact with the molded object; while the upper plunger 30 is shown as provided with or carrying a mandrel 31 adapted to serve as a core for internally shaping the molded object. In the instance shown the molded object (Fig. 8) is cored out throughout its length and is externally coned. This particular example is a tubular high-tension electric insulator molded of bakelite or any other suitable plastic material. It is formed with internal screwthreads at top and bottom, for which purpose the mandrel 31 is externally screwthreaded, as shown (see Fig. 7). For connecting the mandrel to the plunger 30 the mandrel is formed with a base portion 32 (Fig. 7) which enters into a socket 33 in the plunger 30, which socket closely fits the base 32 so as to hold the mandrel firmly in exact alignment. The mandrel is fastened to the plunger 30 by any suitable fastening means such as a bolt 65 shown in Fig. 3. It is desirable to be able to swing the plunger 30 carrying the mandrel and the completed object out of line with the molding chamber 60 after removal of the object, to the lateral position shown in dotted lines in Fig. 2 and in full lines in Fig. 6; for this purpose the plunger 30, instead of being fastened directly to the upper crosshead 20, is fastened to a movable head 34 which is mounted just beneath the crosshead 20, so that the latter may receive the upward thrust therefrom, and such head being suitably mounted for lateral displacement; this mounting is preferably pivotal, so that the head 34 may swing as shown in Fig. 6, and this pivotal mounting is conveniently accomplished by forming the swinging head with a hub 35 encircling the upper part of one of the tie-rods 19, as shown at the left in Fig. 3. It is held up in place when swung out by means of a collar 36 fixed on the tie-rod. This swinging head has a handle 37 for conveniently moving it, and when in operative position is locked fast by a bolt 38 mounted on the crosshead 20 and lifted to unlock it by a handle or lever 39 (Fig. 3).

To prevent scoring or other injury to the interior surface of the molding chamber 60, the plungers 30 and 40 are made a loose fit therewith to have a working clearance, and are provided with close fitting bearing parts 70 and 71 respectively, made of such metal or material as will not injure the surface of the chamber by forcible movement in close fitting contact therewith under the hydraulic pressure. For this purpose these fitting or packing members 70, 71 may well be made of a suitable bronze. They are suitably centered on their respective plungers and may be loosely mounted thereon so as to be readily removable. The member 70 in the specific construction shown is a ring encircling the base portion 32 of the mandrel and held up in place by a flange 73 on the mandrel (Fig. 7). The member 71 in the specific construction shown is a disk which ordinarily requires no fastening to the plunger 40, being merely placed thereon and held by gravity.

For controlling the flow of water or other liquid under pressure to the hydraulic cylinders 12 and 13, it is sufficient to provide two hydraulic valves 75, 76 (Fig. 2) communicating through suitable pipes 77, 78 with the respective cylinders. Another pipe 79 which requires no valve establishes permanent connection from the source of hydraulic pressure to each of the backing cylinders 50. These several hydraulic valves and connections are so well understood in the art that it is not deemed necessary to illustrate them or their connection with the source of hydraulic pressure.

Figure 2:
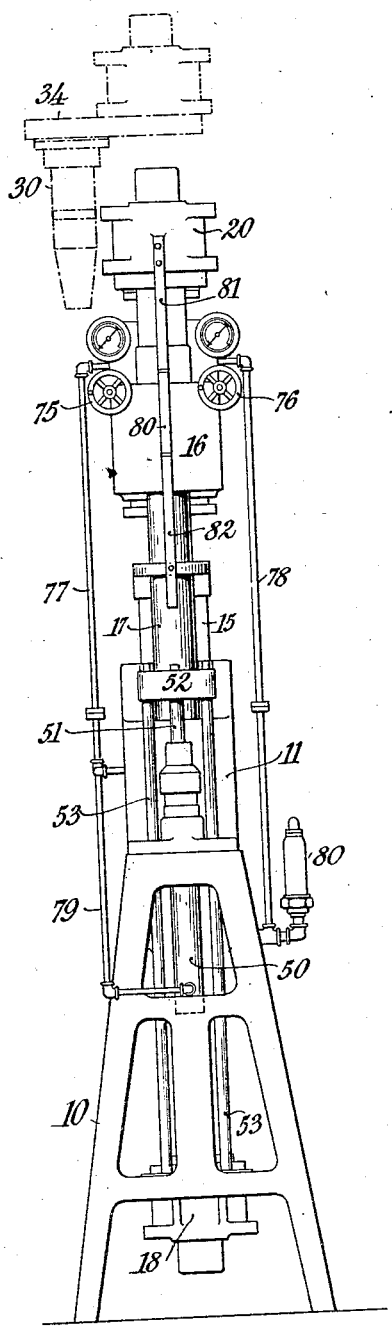
Fig. 2 is a side elevation (viewed from the right in Fig. 1).

In connection with the cylinder 12 or its supply pipe 78, is provided a hydraulic safety valve 80 of well-known construction, which is shown in Fig. 2, and the function of which is to relieve this cylinder of an excessive and dangerous pressure, as will be explained later.

It is desirable to provide the hollow pillar 17 at opposite ends with bushings 66 for making sliding contact with the tie-rods 19. The construction of hollow pillars 17 with the tie-rods 19 sliding through them, affords a very convenient and compact means for guiding these tie-rods in the movement of the members 14, 18, 19 and 20. The crosshead 41 is conveniently mounted to slide against the exterior of the pillars 17, and for maintaining a good sliding joint it may be provided with a lining or bushing 67 (Fig. 3).

To enable the movements of the plungers 40 and 30 within the molding chamber 60 to be readily observed, an indicator is afforded, arranged preferably contiguous to the valves 75, 76. This indicator comprises a stationary part 80 fastened to the upper crosshead 16, and two sliding parts 81 and 82, the former fastened to the upper crosshead 20 and the lower to the crosshead 41. Thus the movements of the upper indicator 81 follow exactly the movements of the upper plunger 30; and the movements of the lower indicator 82 follow exactly the movements of the lower plunger 40. The stationary part 80 may conveniently be provided with any suitable scale marks or graduations.

The operation will now be described.

At starting, the molding chamber 60 is empty, the ram 14 and plunger 30 are up, and the mandrel 31 is applied to the plunger 30, which latter, however, is swung out of line with the molding chamber. The first step is to raise the plunger 40 until its packing head 71 is entered up within the bottom end of the molding chamber, whereby to close the latter at its bottom. Then a weighed or measured quantity of the material to be molded, either in powder or slug form, is introduced from the top into the molding chamber 60. Then the swinging arm 34 is moved to bring the plunger 30 directly above the molding chamber and in axial alignment therewith. Then by means of the valve 76 water is admitted to the lower cylinder 12 to force down the ram 14 and thereby lower the plunger 30 into the molding chamber. Then, or previously, any suitable heating (or cooling) medium may be introduced into the jacket 62 in order properly to heat (or cool) the material to be molded. Thereupon the operation of pressure molding begins to take place and is continued progressively until completed. The molding is performed by pressure between the plungers 30, 40 against the material enclosed within the molding chamber. The operation of these plungers may be controlled by the valves 75, 76, and observed by the movements of the indicators 81, 82. According to the skill or discretion of the operator, and depending upon the particular material being used and the nature of the molded object to be formed, the material is subjected to pressure by the movement of either or both of the plungers 30, 40. These plungers may be moved simultaneously or alternately. These movements may occur little by little. In the case of a material which gradually yields to the softening action of heat, the movements of the plungers in compressing the material may be gradual, and may respond automatically to the degree of yielding of the material. Thus, as an example, the upper plunger 30 may be forced down under hydraulic pressure while the lower plunger is left at near the bottom of the lower opening of the molding chamber; thus the lower plunger simply forms a fixed bottom for the chamber against which the upper plunger may compress the material; as the material yields under the softening effect of heat, the continuous hydraulic pressure on the ram of the upper plunger will force this plunger down little by little until it has reached the extreme of its downward movement; thereafter the lower plunger may be lifted by admitting hydraulic pressure to the cylinder 13, whereby as this plunger rises the material is still further compressed, and this movement also may take place gradually, as the material becomes more yielding. In this manner, by a single source of hydraulic pressure acting on the hydraulic rams, the material under treatment may first receive a lighter pressure transmitted through the larger plunger 30, and may later receive a much heavier pressure transmitted through the smaller plunger 40, the difference in pressures being inversely proportional to the areas of these respective plungers. Another mode of procedure is to move the plungers alternately, and this may be done by continuously applied pressure or by the controlled movement of either or both plungers, at the will of the operator. Thus it will be perceived that this molding press lends itself to a great variety of manipulations in accordance with the nature of the material under treatment and the character of the molded object being made.

As an example may be mentioned the production of high-tension insulators of bakelite of the character shown in Fig. 8; for this material the molding heat is about 300° F., and for large objects the molding operation takes several minutes (it may take as much as fifteen minutes in the case of especially large insulators).

The progress of the molding operation may be watched from the exterior by means of the indicators 81, 82; when the bottom plunger 40 has completed its movement, its ram 15 is locked by closing the corresponding valve 75 while the other valve 76 is left open to keep pressure on the ram 14, and consequently to keep the plunger 30 under pressure for a sufficient time to insure that the chemical reaction of the plastic material shall be complete.

Figure 1:
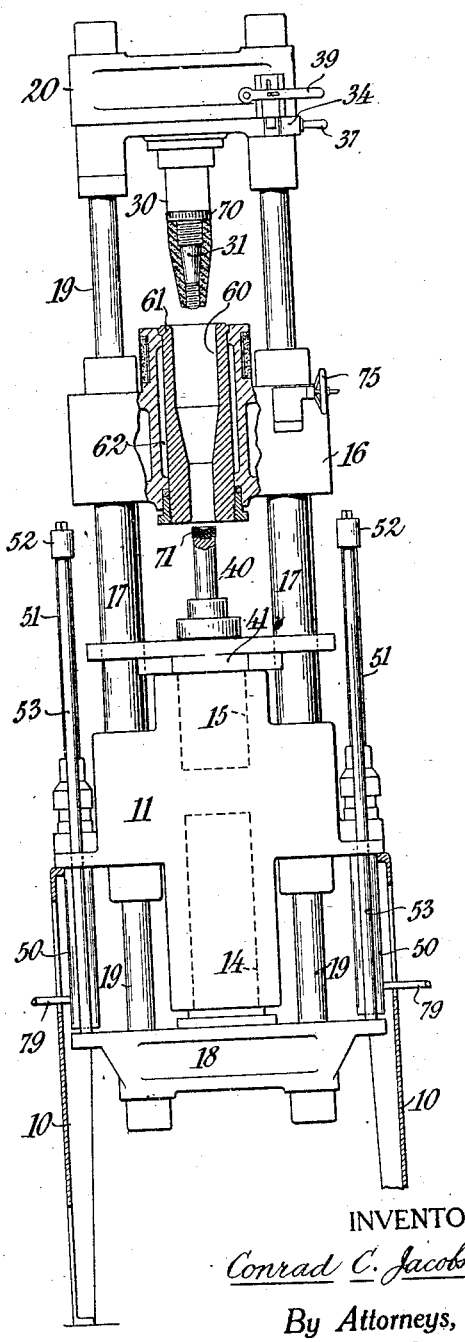
Figure 1 is a front elevation of the press, certain parts being shown in section.

When the molded article has been subjected to pressure and heat for a sufficient time it has then to be moved from the press. For this purpose pressure is first relieved from the hydraulic cylinder 12, whereupon the movable parts 14, 18, 19, 20, 30 are subjected to a lifting stress due to the hydraulic pressure in the backing cylinders 50. The pull upon the upper plunger 30 and its mandrel 31 thus occasioned will not ordinarily free the molded object from its adhesion to the inner walls of the molding chamber. To start the expulsion of the object water is admitted to the cylinder 13 to lift the ram 15 and plunger 40 and thereby press up the molded object, thus forcing it toward the larger end of the molding cavity to free it from the mold. When this movement has freed the molded object from adhesion or skin friction, the object is then lifted out by the upward movement of the mandrel 31, due to the hydraulic pressure in the pull-back cylinders 50. This movement is carried far enough to lift the object entirely out of the molding cylinder, as shown in Fig. 1. Thereupon the operator swings the head 34 out to the position shown in dotted lines in Fig. 2, or to that shown in Fig. 6, whereupon by unscrewing the bolt 65 it releases the mandrel boss 32, and the mandrel 31 carrying the molding object is then dropped off and carried away. The molded object is then cooled or dried, or otherwise treated, as may be required, and at any appropriate time the mandrel is removed from it. In the case of a mandrel formed with screwthreads, as shown, in order to make an internally-threaded molded object, the mandrel has to be removed by unscrewing it from the article.

After removal of the mandrel and molded object the operator applies a new mandrel to the plunger 30 by means of the bolt 65 or any other suitable fastening. In so doing, the packing or anti-friction ring 70 is first applied around the base 32 of the mandrel. The ram 15 is lowered to bring the plunger 40 down out of the molding cavity, so that the latter may be cleaned if necessary. The operator, if necessary, removes the packing disk or head 71, or may replace it by another. The press is then ready for repeating the molding operation.

In the molding operation, while the material under treatment is still plastic the hydraulic thrust upon the smaller plunger 40 transmits through the plastic material an increased or multiplied pressure against the plunger 30, due to the fact that this smaller plunger receives from its ram a pressure much greater in proportion to the area of this plunger than that received by the larger plunger 30; if escape of pressure from the cylinder 12 is prevented by the closing of its valve 76, a greatly increased hydraulic pressure would thus be transmitted from the plunger 30 and intervening parts to the ram 14 and cylinder 12, and this increased pressure might do serious damage. To prevent such result is the function of the safety valve 80 which acts to relieve the pressure when it increases materially beyond the normal.

The operation above described will naturally be varied by any change in the shape and proportions of the molding cavity or chamber 60, and in the relative areas of the plungers 30, 40. It may also be modified by changes in the relative areas of the rams 14, 15 with respect to their connected plungers 30 and 40. These and other variations in the press according to the molded articles to be produced, and in the operation according to the nature of such articles and the character of the material under treatment, are within the skill of those designing and handling such molding presses.

It will be understood that while the embodiment of the invention herein shown and described is its preferred embodiment, yet it may be varied within the scope of the appended claims.

I claim as my invention:

1. A hydraulic molding press comprising a molding chamber open at opposite ends, plungers adapted to enter such ends, and hydraulic cylinders and rams for moving said plungers, combined with indicating means comprising indicators connected to move with the respective plungers, and a stationary part traversed by said indicators, whereby to show the movements within the molding chamber of the respective plungers.

2. A hydraulic molding press comprising a molding chamber with plungers entering it at opposite ends, one of said plungers provided with an annular packing head of metal adapted to move within the molding chamber under pressure, without injury to its walls, and a flanged mandrel holding said annular head in place.

3. A hydraulic molding press comprising a molding chamber and a plunger entering it and of smaller diameter to leave a working clearance between, and a packing head projecting slightly beyond the plunger to make a close fit with the chamber, and of metal adapted to move under pressure against the chamber walls without injury to such walls.

In witness whereof, I have hereunto signed my name.

CONRAD C. JACOBSON.